(12) United States Patent
Chauvel et al.

(10) Patent No.: US 6,321,299 B1
(45) Date of Patent: Nov. 20, 2001

(54) COMPUTER CIRCUITS, SYSTEMS, AND METHODS USING PARTIAL CACHE CLEANING

(75) Inventors: Gérard Chauvel, Antibes; Serge Lasserre, Frejus; Dominique Benoît Jacques d'Inverno, Villeneuve Loubet, all of (FR)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/187,118

(22) Filed: Nov. 5, 1998

(30) Foreign Application Priority Data

Apr. 29, 1998 (FR) .................................................. 98-05420

(51) Int. Cl.⁷ ................................................... G06F 12/08
(52) U.S. Cl. .......................... 711/135; 711/129; 711/203; 711/218; 711/219
(58) Field of Search ................................... 711/135, 129, 711/203, 218, 219

(56) References Cited

U.S. PATENT DOCUMENTS

| | | | |
|---|---|---|---|
| 4,426,682 | * 1/1984 | Riffe et al. ........................... | 711/135 |
| 5,045,996 | 9/1991 | Barth et al. ........................... | 711/143 |
| 5,423,014 | * 6/1995 | Hinton et al. ............................ | 711/3 |
| 5,526,511 | * 6/1996 | Swenson et al. ...................... | 711/134 |
| 5,632,038 | 5/1997 | Fuller .................................... | 713/324 |
| 5,826,057 | * 10/1998 | Okamoto et al. ............... | 395/500.45 |
| 5,845,325 | * 12/1998 | Loo et al. ............................. | 711/135 |
| 6,088,773 | * 7/2000 | Kano et al. ........................... | 711/161 |

FOREIGN PATENT DOCUMENTS

WO 84/02409   6/1984   (WO) .

* cited by examiner

*Primary Examiner*—Hiep T. Nguyen
(74) *Attorney, Agent, or Firm*—Pedro P. Hernandez; W. James Brady, III; Frederick J. Telecky, Jr.

(57) ABSTRACT

A method (50) of operating a computing system (10). The computing system comprises a cache memory (12b), and the cache memory has a predetermined number of cache lines. First, the method, for a plurality of write addresses, writes data (64) to the cache memory at a location corresponding to each of the plurality of write addresses. Second, the method cleans (70) a selected number (68) of lines in the cache memory. For each of the selected number of lines, the cleaning step evaluates a dirty indicator corresponding to data in the line and copies data from the line to another memory if the dirty indicator indicates the data in the line is dirty. Lastly, the selected number of lines which are cleaned is less than the predetermined number of cache lines.

29 Claims, 4 Drawing Sheets

COMPUTER CIRCUITS, SYSTEMS, AND METHODS USING PARTIAL CACHE CLEANING

CROSS-REFERENCES TO RELATED APPLICATIONS

This application claims a priority right from France Patent Application 09 05420, entitled Circuits, systémés et procédés d'ordinateur utilisant un nettoyage partiel d'une mémoire cache, having inventors Gérard Chauvel, Serge Lasserre, Dominique Benoît Jacques d'Invemo, and filed Apr. 29, 1998.

STATEMENT REGARDING FEDERALLY SPONSORED RESEARCH OR DEVELOPMENT

Not Applicable.

BACKGROUND OF THE INVENTION

The present embodiments relate to computing environments implementing one or more cache memories.

Cache circuits are important components which are frequently used in contemporary computing systems (e.g., microprocessors and the like) to increase system performance by reducing the potential amount of time needed to access information. Typically, a cache circuit includes various components, such as a tag memory which is commonly a random access memory ("RAM"). The tag RAM stores so-called tag information which corresponds to the cached data which is commonly stored in a separate cache data RAM. The tag information may include various characteristics corresponding to the cached data, such as the actual address where the cached data may be found in some other memory device (e.g., an external memory structure). Another component of a cache circuit is the hit detection circuit associated with the tag RAM. The hit detection circuit (of which there are N such circuits in an N-way set associative cache circuit) compares an incoming address with the actual address stored as part of the tag information. If the comparison matches, there is said to be a "hit" in the cache circuit, that is, the data sought at the incoming address may be retrieved directly from the cache data RAM; on the other hand, if the comparison does not match, there is said to be a "miss" in the cache circuit, that is, the data sought at the incoming address is not located, or for some other reason is not reliable, within the cache data RAM. In the event of a cache miss, then the data must be retrieved from a memory higher in the memory hierarchy, such as the main (i.e., often external) memory or in another cache located at a higher level in the system. Thus, access to data following a cache miss requires a greater amount of time then when a cache hit occurs and, indeed, if the access is from external memory the time required may be considerable as compared to the access time in the event of a cache hit.

While the above illustrates that cache memories are generally perceived as beneficial, as computing devices and environments become more complex there is a need to further scrutinize cache operations to determine whether additional efficiency may be achieved. In this regard the present inventors have recognized that a number of clock cycles may be eliminated in the context of certain operations of cache circuits. The reduction of expended clock cycles relating to cache operations improves system speed. In addition, this reduction of clock cycles also reduces overall system power consumption, which is of critical consideration in many contemporary systems such as in portable computing devices.

BRIEF SUMMARY OF THE INVENTION

In one preferred embodiment, there is a method of operating a computing system. The computing system comprises a cache memory, and the cache memory has a predetermined number of cache lines. First, the method, for a plurality of write addresses, writes data to the cache memory at a location corresponding to each of the plurality of write addresses. Second, the method cleans a selected number of lines in the cache memory. For each of the selected number of lines, the cleaning step evaluates a dirty indicator corresponding to data in the line and copies data from the line to another memory if the dirty indicator indicates the data in the line is dirty. Lastly, the selected number of lines which are cleaned is less than the predetermined number of cache lines. Other circuits, systems, and methods are also disclosed and claimed.

DETAILED DESCRIPTION OF THE INVENTION

Figure 1:
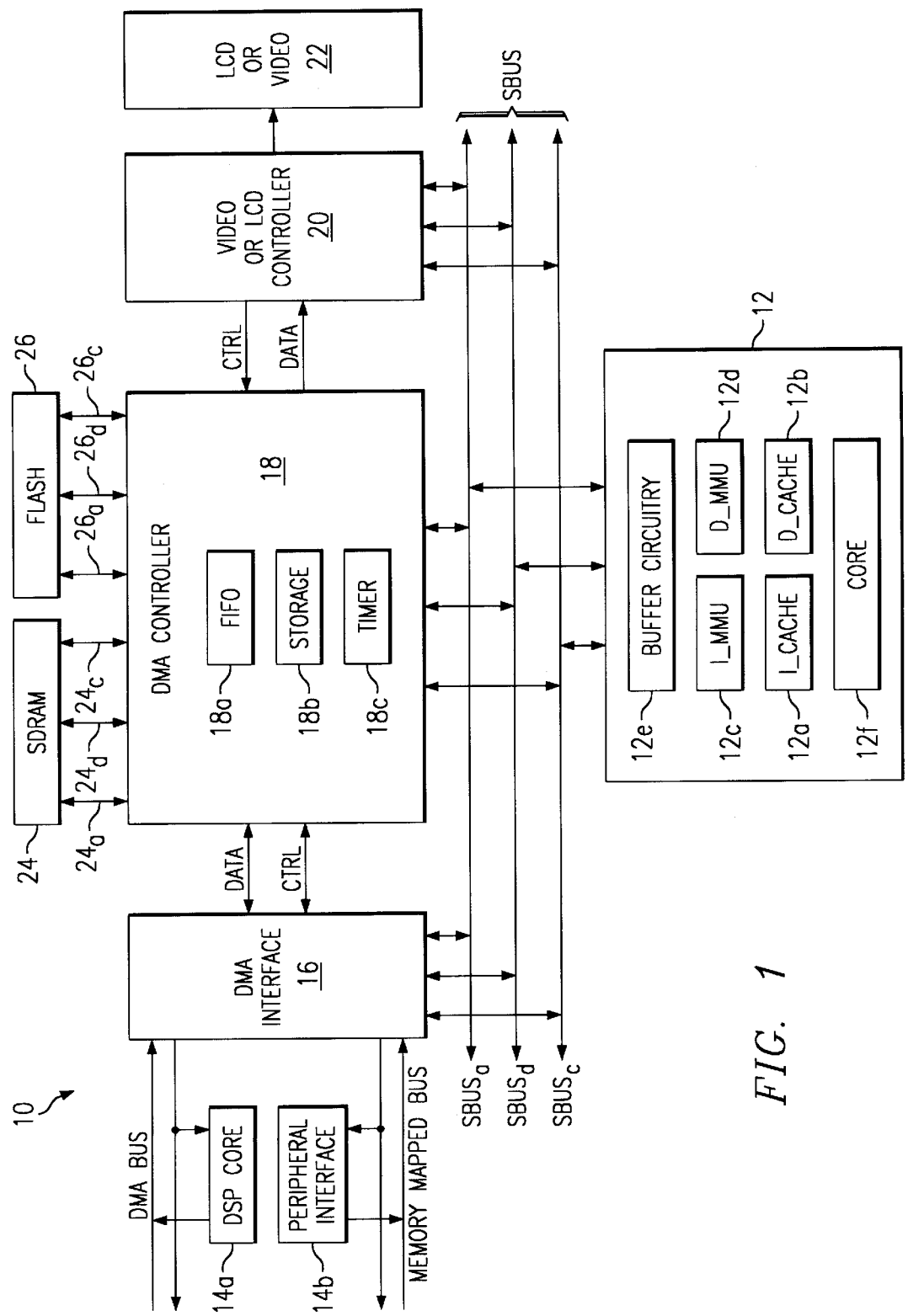
FIG. 1 illustrates a block diagram of a wireless data platform in which the present embodiments may be implemented

FIG. 1 illustrates a preferred embodiment of a general wireless data platform 10 into which various of the cache embodiments described in this document may be implemented, and which could be used for example in the implementation of a Smartphone or a portable computing device. Wireless data platform 10 includes a general purpose (Host) processor 12 having an instruction cache 12a and a data cache 12b, each with a corresponding instruction memory management unit ("MMU") 12c and 12d, and further illustrates buffer circuitry 12e and lastly an operating core 12f, all of which communicate with a system bus SBUS. The SBUS includes data $SBUS_d$, address $SBUS_a$, and control $SBUS_c$ conductors. A digital signal processor ("DSP") 14a having its own internal cache (not shown), and a peripheral interface 14b, are coupled to the SBUS. Although not shown, various peripheral devices may therefore be coupled to peripheral interface 14b, including a digital to analog converter ("DAC")or a network interface. DSP 14a and peripheral interface 14b are coupled to a DMA interface 16 which is further coupled to a DMA controller 18. DMA controller 18 is also coupled to the SBUS as well as to a video or LCD controller 20 which communicates with an LCD or video display 22. DMA controller 18 is coupled via address $24_a$, data $24_d$, and control $24_c$ buses to a main memory which in the preferred embodiment is a synchronous dynamic random access memory ("SDRAM") 24. Similarly, DMA controller 18 is coupled via address $26_a$, data $26_d$, and control $26_c$ buses to a flash memory 26 (or memories).

The general operational aspects of wireless data platform 10 are appreciated in connection with the present inventive concepts by noting that it utilizes both a general purpose processor 12 and a DSP 14a. Thus, there are multiple cores sharing a single memory, and it will be appreciated that the inventive methodology described later provides various improvements to system performance for such a multi-core system (which may be the case also for systems other than platform 10). In addition, note that many of the inventive aspects described below also may improve operations in a mono-processor system.

Figure 2:
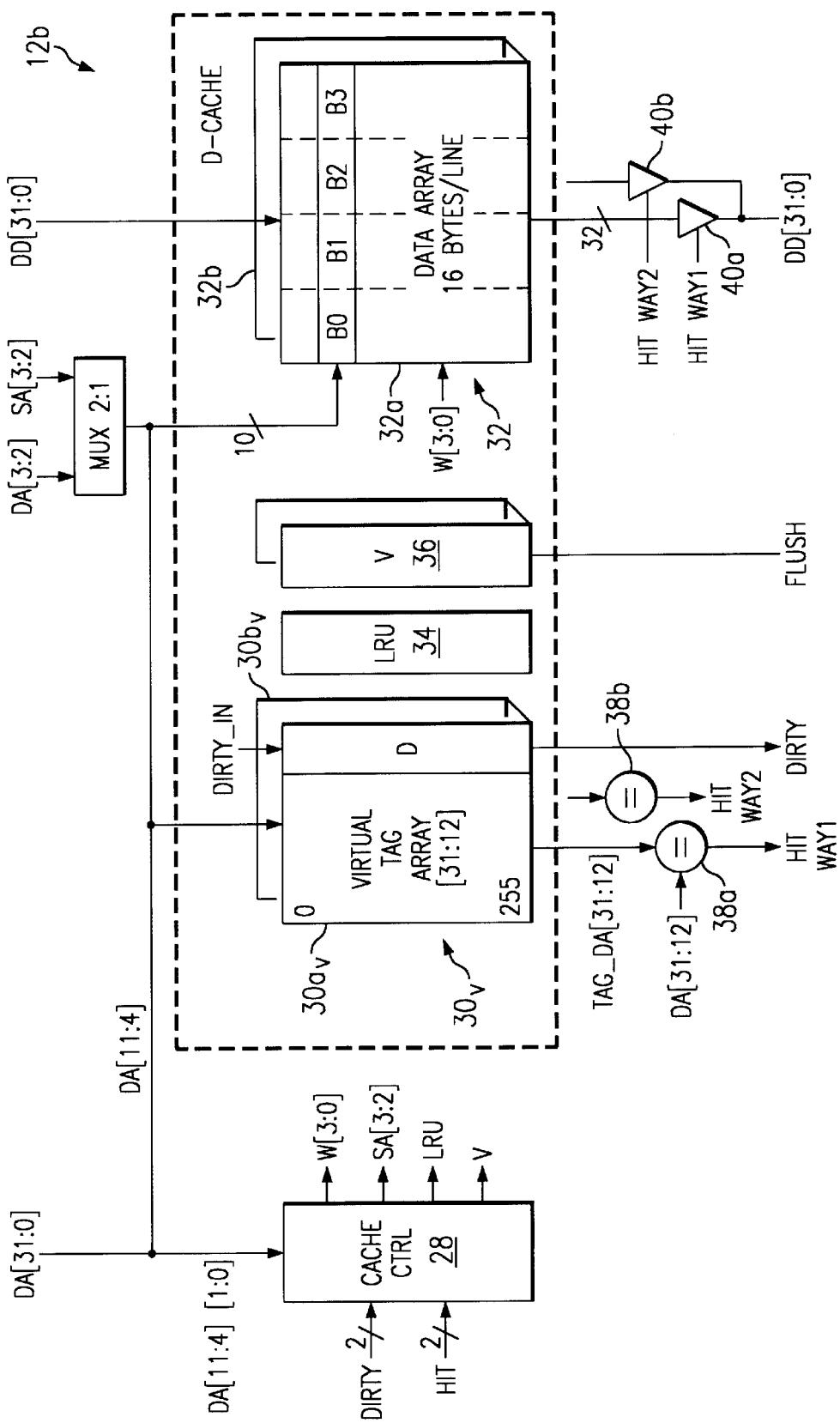
FIG. 2 illustrates a block diagram of a cache architecture which may be used in the platform of FIG. 1 and in other processing devices.

Turning the focus now to cache aspects of the preferred embodiment, FIG. 2 illustrates by way of example the architecture of data cache 12b of general purpose processor 12 from FIG. 1. Before detailing this structure, it should be understood that various of the present inventive teachings may be implemented in connection with other caches such as instruction cache 12a, either or both of the caches of DSP 14a, or in yet other caches (e.g., unified cache) in platform 10. In addition, various of the inventive teachings described below may be used in conjunction with any processing device which would benefit from a cache memory, including smartphones, PDAs, palmtop computers, notebook computers, desktop computers and so on. Lastly, although various details are presented below with respect to data cache 12b, it also should be noted that many of those details (e.g., set association, array sizes, address and storage lengths) are for illustrative purposes only.

Looking now to the detail of data cache 12b shown in FIG. 2, it includes a cache controller 28 which receives a memory address, which in this case is a portion of a 32-bit data address DA[31:0], where the portion received includes bits "[11:4]" indicating that cache controller 28 receives bits "4" through "11" of the 32-bit address, and further receives bits DA[1:0], where similarly the "[1:0]" indicates that cache controller 28 receives bits "0" through "1" of the 32-bit address. Cache controller 28 is coupled to a virtual tag array $30_v$, and which store tags which correspond to lines in a data array 32. In this regard and of note for later discussion, virtual tag array $30_v$ stores a dirty bit for each line in data array 32, where an indication of dirty data is known in the cache art to represent that data which has been brought into data array 32 has been changed but that changed copy has not been output to a memory higher in the memory system (e.g., main memory). Also including indications corresponding to each line in data array 32 are least recently used ("LRU") bits in an LRU indicator array 34 and valid bits in a valid indicator array 36.

In the preferred embodiment, data cache 12b is arranged as a two-way set associative cache; therefore, tag array $30_v$ has two planes $30a_v$ and $30b_v$, respectively. Similarly, data array 32 has two memory planes 32a and 32b. In the illustrated embodiment each plane 32a and 32b is 1024×32 bits (i.e., 4 bytes) and, therefore, requires four consecutive addresses to form a line of 16 bytes. The outputs of planes $30a_v$ and $30b_v$ are output to respective comparators $38_a$ and $38_b$. DA[31:12] are also coupled to both comparators $38_a$ and $38_b$. Each comparator $38_a$ and $38_b$ generates a one-bit output designated Hit way1 and Hit way2, respectively. The Hit way1 and Hit way2 signals are connected to the control inputs of respective passgates 40a and 40b, each of which provides as an output the addressed 32-bit data DD[31:0].

The operation of a set associative cache is well known in the art and is summarized here for a read operation merely to present a context for details to be understood in a later discussion relating more particularly to a cache cleaning process. Looking to the read operation, when an address DA[31:0] is received for a memory access, address bits DA[11:4] are used as an address into each plane $30a_v$ and $30b_v$ of virtual tag array $30a_v$. Each plane $30a_v$ and $30b_v$ outputs tag bits Tag_DA[31:12] responsive to the address, where that tag includes an indication of the address of the data stored in data array 32. Next, bits DA[31:12] are compared via comparators 38a and 38b to the tags to determine if a match (i.e., hit) occurs, and if so the output of one of comparators 38a and 38b enables the Hit way1 or Hit way2 signal, respectively. During this same process, note that an index portion of the address, where the index in the current example is bits DA[11:4], is applied to data array planes 32a and 32b. Thus, both planes output information from that index and the enablement of either the Hit way1 or Hit way2 signal causes the output of one of those planes to be presented as the output data DD[31:0]. Of course, if a cache miss occurs (i.e., neither the Hit way1 signal nor the Hit way2 signal is enabled), then the addressed information is sought from a memory higher in the memory hierarchy than cache 12b. Lastly, recall that each memory address in the tag memory has a corresponding valid bit in array indicator 36. These bits indicate whether the data at the corresponding location in the cache is valid. The bits in LRU array indicator 34 determine which line of planes 32a and 32b is updated after a cache miss.

Figure 3:
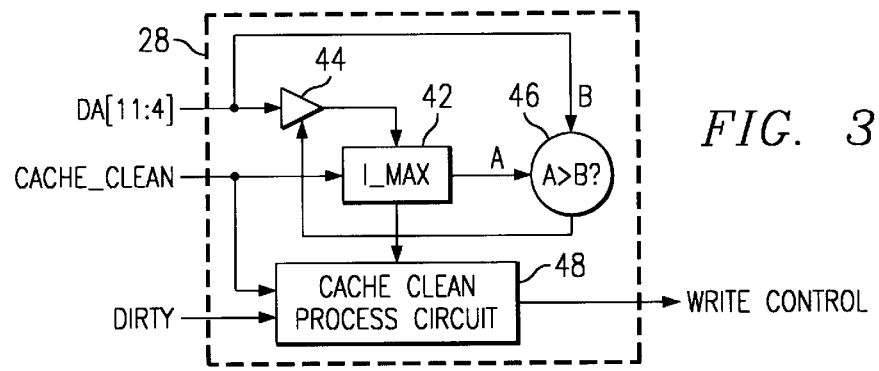
FIG. 3 illustrates a block diagram of portions of the cache controller of FIG. 2 where those portions are directed to a cache cleaning methodology of the preferred embodiment.

Data cache 12b also includes a cache clean feature which can significantly improve the efficiency of the operation of the cache, as is now first detailed functionally by way of the block diagram of FIG. 3. Specifically, FIG. 3 illustrates cache controller 28 in greater detail insofar as the cache clean feature is concerned. Cache controller 28 includes an address register 42 for storing an address value designated I_MAX and which, as appreciated later, stores certain copies of the data address index (i.e., DA[11:4]) as controlled by additional circuitry now described. The address input of address register 42 is connected to the output of a passgate 44, which has its data input connected to receive the address index DA[11:4]. Additionally, the address index DA[11:4] is connected to the input of a comparator 46, which further is connected to receive the value of I_MAX as stored in register 42. For reasons detailed below, when a cache hit occurs in response to write to data cache 12b, comparator 46 determines whether the value of I_MAX is greater than an incoming address index DA[11:4] and, if so, enables the control input of passgate 44 so that the then incoming address index DA[11:4] is copied into register 42, thereby updating the value of I_MAX.

Completing FIG. 3, cache controller 28 also includes a cache clean process circuit 48, which is connected to receive as one input dirty bits as provided from virtual tag array $30_v$, and which is further connected to receive a CACHE_LEAN signal to enable its functionality as detailed below. Indeed, note further that the CACHE_CLEAN signal is also connected to clear the value of I_MAX in register 42. Additionally, the value of I_MAX in register 42 is also an input to cache clean process circuit 48. The structure of cache clean process circuit 48 may be chosen by one skilled in the art from various alternatives given its functionality as will be appreciated from the following description of FIGS. 4 and 5.

Figure 4:
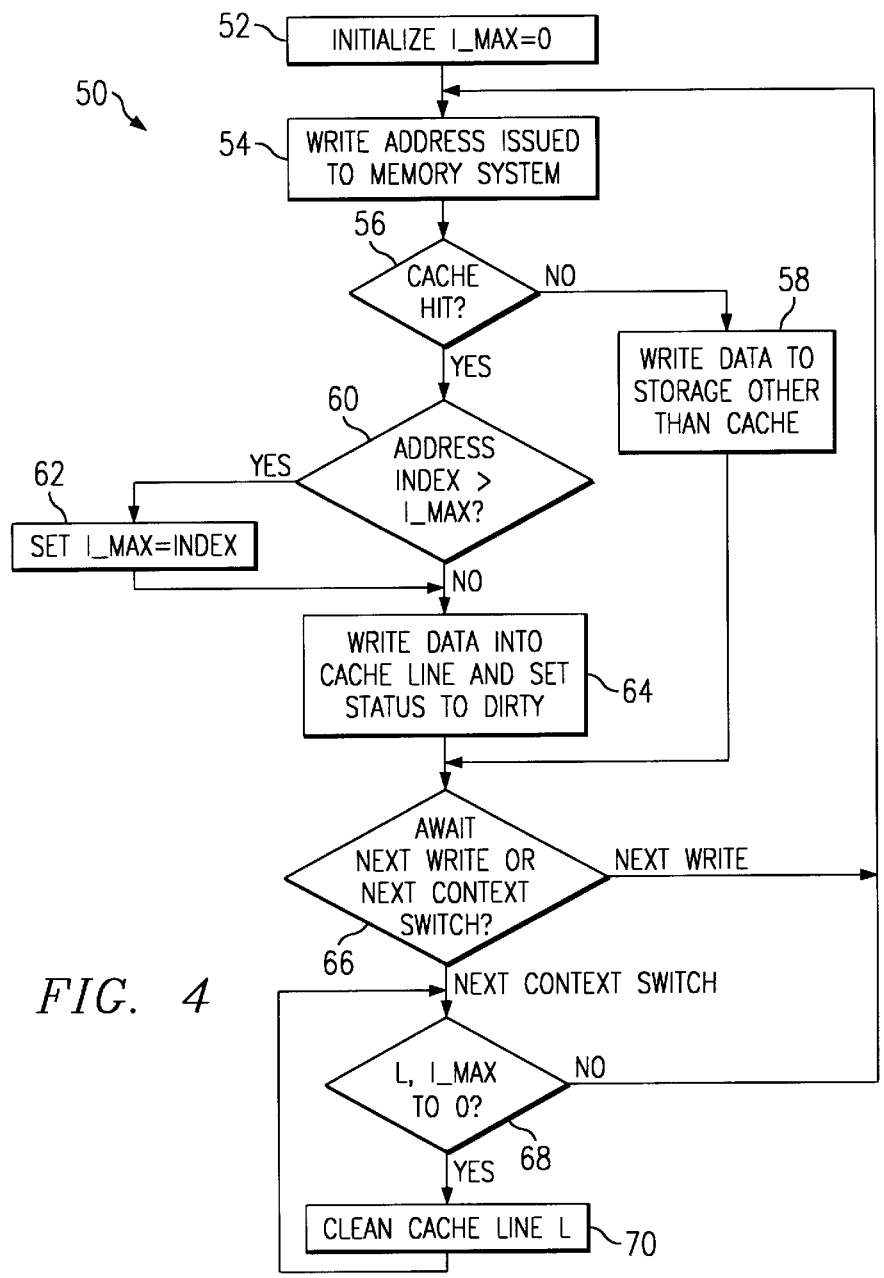
FIG. 4 illustrates a flow chart of a first embodiment for reducing clock cycles required in connection with a cache clean occurring during a context switch of the general purpose processor of FIG. 1, where the extent of the cache clean is determined by the highest address written in the cache prior to the context switch.

FIG. 4 illustrates a flow chart of a method designated generally at 50 and which describes the preferred operation of cache controller 28 with respect to writes of data array 32, where such a method is accomplished in large part through the operation of the circuit blocks shown in FIG. 3. Method 50 commences with a step 52 where the value I_MAX (in register 42) is cleared to a value of zero. In the preferred embodiment, note that this step may be achieved by asserting the CACHE_CLEAN signal. Further in this regard, it will be appreciated by the conclusion of the discussion of method 50 that the present embodiment provides improvements in connection with operations involving context switches. Indeed, although not shown, step 52 may be part of an initialization of data cache 12b, as in response to a first context switch. Having noted these alternatives, it may now be helpful to examine what is meant by a context switch for the sake of some readers of this document, although such terminology is known in the art. A context switch occurs in response to various events, such as an external interrupt or the expiration of a clock timer such as is often maintained by an operating system. This switch relates to a change in process, which is appreciated in platform 10 or other processor controlled systems where operations are separated into processes. Each process is defined by various matters, and these matters often include the area of memory used by the process, the input/output mapping of the process, the memory management of the process such as address translation, and other process characterizing values typically stored in general purpose registers. A context switch occurs when the current process is changed to a new process, and thus when it is necessary to store information describing each of these aspects of the current process so that after the next process (or after several other processes) is complete, this information may be retrieved when what is now the current process is once again switched to so that it again becomes the current process.

Returning now to method 50, after step 52 the flow continues to step 54. Step 54 represents that a write address is issued to the memory system which includes data cache 12b. Briefly looking back to FIG. 1, therefore, an example of step 52 occurs when core 12f issues an address to write data to SDRAM 24, and note that SDRAM 24 is higher in a memory system which includes data cache 12b at a lower level. Next, method 50 continues from step 54 to step 56.

Step 56 determines whether a hit occurs in data cache 12b in response to the write address issued in step 54. If a cache hit does not occur (i.e., if a cache miss occurs), then method 50 continues from step 56 to step 58. Conversely, if a cache hit occurs, then method 50 continues from step 56 to step 60. Each of these alternative paths is discussed below.

Looking to the instance of step 58, and recognizing that it occurs in response to a cache miss, it alone operates in the same manner as known in the cache art. Specifically, step 58 writes the data to the address location in a storage circuit other than data cache 12b. For example, in platform 10, this write is to the appropriate address in SDRAM 24.

Looking to the instance of step 60, which recall is reached when a cache hit occurs, it determines whether the current address index DA[11:4] value is greater than the value of I_MAX. Returning briefly to FIG. 3, note that the operation of step 60 may be achieved by comparator 46. If the address index DA[11:4] value is greater than the value of I_MAX, then method 50 continues from step 60 to step 62, and if not, then method 50 skips to step 64, described below after first considering further the operation of step 62. Step 62, having been reached because the address index DA[11:4] value exceeds the value of I_MAX, stores the current address index DA[11:4] as the new value of I_MAX. In this regard, note two matters. First, since the value of I_MAX was cleared in step 52, then the first time step 60 is reached and the address indexDA[11:4] is non-zero then step 60 should pass the method flow to step 62 and the value of I_MAX is thereby increased to the current address index. Second, returning again to FIG. 3, note that step 62 is achieved by the output of comparator 46 and its control of passgate 44. Specifically, if comparator 46, in performing step 60, determines that DA[11:4] exceeds the value of I_MAX, then its output enables passgate 44 so that DA[11:4] is copied into register 42 thereby becoming the new value of I_MAX. Next, method 50 continues from step 62 to step 64.

Step 64 writes the data at issue into data array 32 at the address specified in step 54. Additionally, the dirty bit in virtual tag array 30$_v$ and corresponding to the written data cache line is set to a state of dirty. Next, method 50 continues from step 64 to step 66. Step 66 represents a wait state, where method 50 awaits one of two events, those being either the issuance of another write address or a context switch. If another write address is issued, then method 50 returns from step 66 to step 54. In that event, one skilled in the art will appreciate that the preceding steps occur again, and if the index of the newly issued write address is greater than the current value of I_MAX, then that index will become the new value of I_MAX. Indeed, this looping operation may occur for numerous successive write operations, where each time the preceding steps operate such that I_MAX may be increased. Looking then to the effect of a current context switch, method 50 continues from step 66 to step 68 and, from the preceding, it should be appreciated that the value of I_MAX at this time represents the largest value of the address index which has been written since the last context switch and prior to the current context switch.

Step 68 represents a cache cleaning process, and as appreciated later, one which may dramatically improve performance and efficiency in contrast to the prior art. Particularly, step 68 illustrates that for a loop of L, from a value of L equal to I_MAX down to a value of L equal to 0, a step 70 occurs whereby each cache line having an address equal to L is cleaned. In other words, for each instance of step 68, L is decreased starting at I_MAX, and each time through the time that the value of L equals 0, then the flow continues to a cleaning operation in step 70 and then loops back to step 68 for the next iteration. Looking to step 70, cleaning of a cache line is known in the art, and involves evaluating the tag (or tags) for the line to determine if any data in the line is dirty. In the present embodiment, this operation is controlled by cache clean process circuit 48 of FIG. 3 as enabled by the CACHE_CLEAN signal. The process determines if the line includes dirty data, and if so, that data (or the entire line) is written to a higher memory. To the contrary, if for a given line its dirty bit(s) indicates that the entire line is clean, then the data line corresponding to the dirty bit(s) is not written out to the higher memory.

From the above, and particularly from the effect of I_MAX and steps 68 and 70, one skilled in the art should appreciate that after a context switch, data cache 12b is cleaned, but the cleaning process spans only from address 0 of the cache through the highest cache address which was written prior to the context switch (i.e., as stored in I_MAX). This methodology is perhaps better understood by way of an example. Suppose that after step 52, there are five successive cache writes to respective index addresses 0, 2, 4, 6, and 8, and following those writes there is a context switch. At this point, therefore, the value of I_MAX equals 8, and in response to the context switch steps 68 and 70 will clean data array 32 only from address 0 through address 8. Note now that such an operation is entirely different from the prior art. Specifically, in the prior art, in response to a context switch, the entire cache is cleaned. Thus, each cache line is evaluated to determine if its contents are dirty and, if so, those dirty contents are written out to higher memory. Given this contrast, one skilled in the art should appreciate that the present inventive embodiment is considerably more efficient. By way of illustration and returning to the example of five successive addresses, suppose that the cache includes addresses through 255. In such a case, the prior art would expend additional time, which may well be a single clock cycle per addressable line, to evaluate and clean each of addresses 9 through 255. In contrast, the preferred embodiment stops the cleaning operation at some point which is less than the entirety of the cache, where in the embodiment just described the stoppage is after completing a cleaning of the highest address written prior to the context change (where that address is 8 in the current example). Thus, the number of overall clock cycles required for the cleaning operation may be significantly reduced, and this reduction also reduces overall power consumption. Additionally, note that in environments which have frequent context switches, such as may be the case for platform 10, the efficiencies of the preferred embodiment accumulate for each context switch. This overall efficiency is even more pronounced where there are only a few cache writes between the time of context switches.

Also from the above discussion of step 68, note that it advances the cleaning process down to address 0. This approach is preferred because it is independent from the cache size. In any event, it is therefore assumed for such an approach that completing the cleaning operation through address 0 will cause lines having dirty data to be written out to main memory. Given this observation, however, note that two alternative approaches may be used if the data at or near address 0 is not likely to have been changed. Each of these alternatives is discussed below.

In a first alternative to the approach of I_MAX as discussed above, a second address value is established to determine the lowest address index which causes a cache hit for a given context switch, and this second value is used along with the value of I_MAX. Thus, assuming that this second address value is named I_MIN, it could initially be set to a large value (e.g., the highest address of the cache) and reduced to the lowest address index value which causes a cache hit during a given context switch. By way of example, therefore, suppose the highest index address of the cache is 255, and that there are five successive cache writes to respective index addresses 8, 16, 24, 32, and 40, and following those writes there is a context switch. In this example, initially I_MAX equals0, and I_MN equals 255. Based on the five accesses, I_MAX would be increased for each access until it equals 40. On the other hand, the first access to index address 8 would decrease the value of I_MIN to a value of 8, and the remaining accesses would not affect that value because they are higher index addresses then the updated value of I_MIN. Concluding, this alternative, step 60 would be modified so that step 70 cleans all lines between and including the address from I_MIN to the address of I_MAX, thereby cleaning the number of cache lines between the lowest changed address and the highest changed address, and thereby once again cleaning a number of lines less than the entire number of lines in the cache.

In a second alternative to the approach of I_MAX as discussed above, a different address value is established to determine the lowest address index which causes a cache hit for a given context switch, and this different value is used alone and to clean to the highest address of the cache. In simple terms, this is an operation in opposite fashion of the process of using the value of I_MAX. Assuming again that this different address value is named I_MIN, it could initially be set to a large value (e.g., the highest address of the cache) and reduced to the lowest address index value which causes a cache hit during a given context switch. However, when step 68 is implemented, it would be modified so that step 70 cleans all lines from the address value of I_MIN to the top of the cache, that is, to the highest address of the cache.

Figure 5:
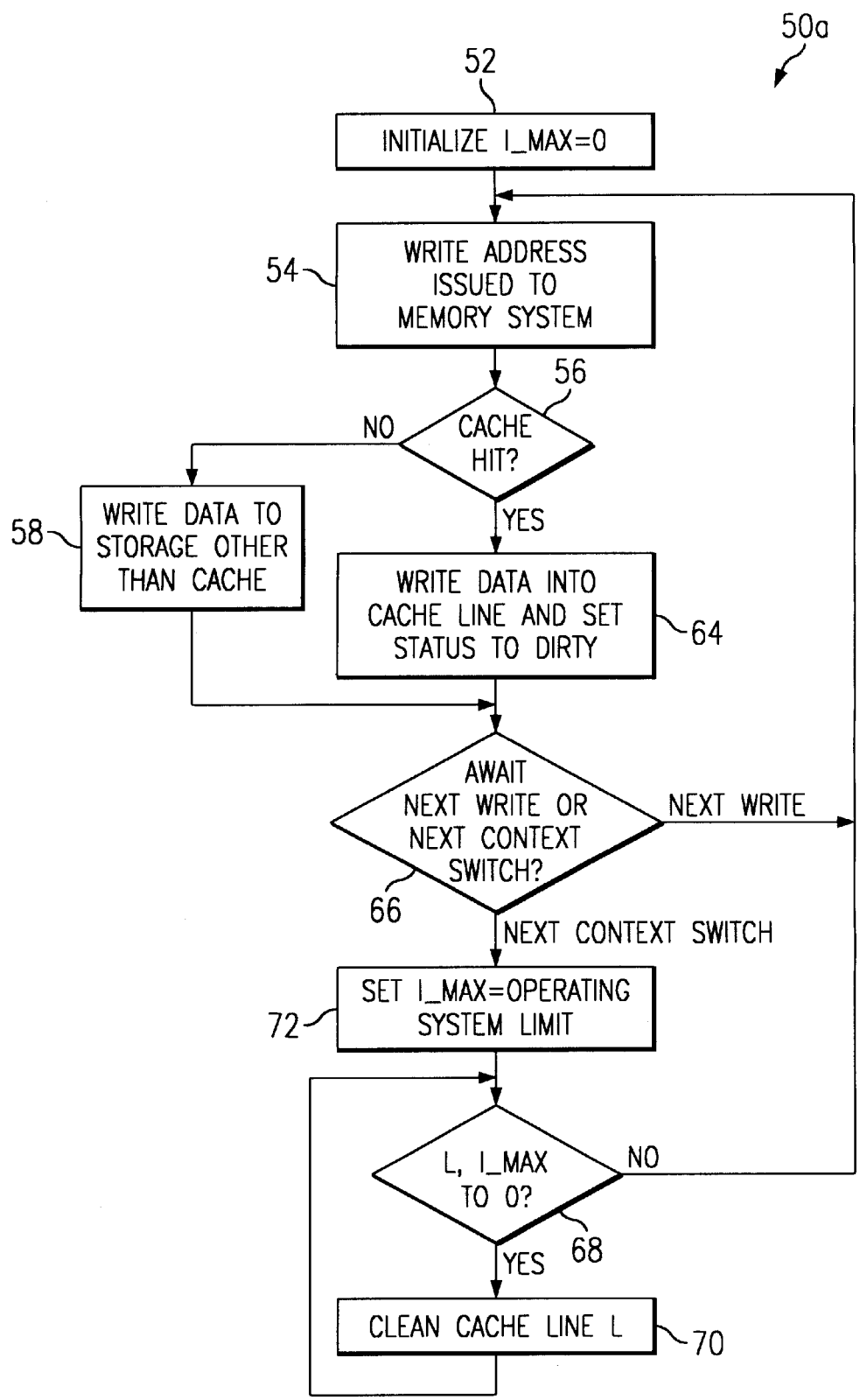
FIG. 5 illustrates a flow chart of a second embodiment for reducing clock cycles required in connection with a cache clean occurring during a context switch of the general purpose processor of FIG. 1, where the extent of the cache clean is determined by the highest address available to the operating system for writing to the cache prior to the context switch.

Given the limiting looping operation in view of the I_MAX value, the present inventive scope includes an alternative embodiment as shown in FIG. 5. In this alternative approach indicated as a method 50a, the functionality of comparator 46 of FIG. 3 is not used but instead an address value maintained by the operating system as pertaining to a current context is used to determine the value of I_MAX at the time of the context switch. This difference is noted below with respect to step 72, where the remaining steps shown in FIG. 5 are the same as steps shown in shown in FIG. 4.

Turning to method 50a, steps 52 through 66 are not detailed here since they were discussed above. Looking therefore to step 72, note that it sets the value of I_MAX, but here that value is set based on a value which is accessible in some implementations of operating systems. Specifically, some operating systems maintain a maximum cache line value for a given context. Thus, after step 66 is satisfied, the operating system will then have available a maximum cache lineaddress which corresponds to the context which is being completed (i.e., from which the switch is occurring). Step 72 sets the value of I_MAX equal to this maximum cache line address. Accordingly, when method 50a continues to step 68, and provided that this maximum cache line address was less than the number of total lines in the cache, then the looping operation caused by step 68 and step 70 once again causes a cleaning of lines in the data cache, and once again the number of lines in the which are cleaned is less than the total number of lines in the cache.

From the above, it may be appreciated that the above embodiments reduce the number of clock cycles related to cache cleaning operations after a context switch, and provide various improvements over the prior art. In addition to the above teachings, it should also be noted that while the present embodiments have been described in detail, various substitutions, modifications or alterations could be made to the descriptions set forth above without departing from the inventive scope. For example, while in the preferred embodiment the occurrence of a context switch is what triggers the resetting of I_MAX and later limits it in response to a successive context switch, one skilled in the art may ascertain some other event or events whereby a first event occurrence resets the value of I_MAX and a second event occurrence then ends the upward adjustments of the value of I_MAX, after which again the cache is cleaned from some minimum address to the last saved value of I_MAX. As another example, while FIGS. 4 and 5 illustrate a generally sequential method via flow charts, it should be understood that various circuits may be used to implement such operation such as a state machine to perform these steps and, thus, the flow may be to alternative states from each state rather than sequential as shown in the flow diagram. As yet another example, while data cache 18b has been used herein to demonstrate various aspects many of the present inventive teachings apply to various other cache architectures. As yet a final example, platform 10 is only by way of illustration, and it should be understood that it may be modified further and also that numerous of the inventive aspects may be implemented in other systems having one or more cache memories. Thus, the previous description, these examples, and other matters ascertainable by one skilled in the art given the present teachings should help illustrate the inventive scope, as defined by the following claims.

What is claimed is:

1. A method of operating a computing system comprising a cache memory having a predetermined number of cache lines, comprising the steps of:
   first, for a plurality of write addresses, writing data to the cache memory at a location corresponding to each of the plurality of write addresses; and
   second, cleaning a selected number of lines in the cache memory in response to a context switch by the computing system;
      wherein for each of the selected number of lines the cleaning step comprises:
         evaluating a dirty indicator corresponding to data in the line; and
         copying data from the line to another memory if the dirty indicator indicates the data in the line is dirty; and
      wherein the selected number of lines cleaned is less than the predetermined number of cache lines and further comprising the steps of:
         storing a value in an address indicator; and
         in response to each of the plurality of write addresses, setting the value equal to the write address if the write address is greater than what is stored in the address indicator, wherein the value in the address indicator represents a final value upon completing the plurality of write addresses; and
      wherein the selected number of lines is responsive to the final value.

2. The method of claim 1 wherein the step of cleaning a selected number of lines in the cache memory comprises cleaning all lines in the cache memory between a first address through and including the final value.

3. The method of claim 2 wherein the first address is at address zero of the cache memory.

4. A method of operating a computing system comprising a cache memory having a predetermined number of cache lines, comprising the steps of:
   first, for a plurality of write addresses, writing data to the cache memory at a location corresponding to each of the plurality of write addresses; and
   second, cleaning a selected number of lines in the cache memory in response to a context switch by the computing system;
      wherein for each of the selected number of lines the cleaning step comprises:
         evaluating a dirty indicator corresponding to data in the line; and
         copying data from the line to another memory if the dirty indicator indicates the data in the line is dirty; and
      wherein the selected number of lines cleaned is less than the predetermined number of cache lines and the computing system comprises an operating system and that maintains a maximum cache line address corresponding to a context of operation for the computing system; and
   further comprising the step of setting the selected number in response to the maximum cache line address.

5. A method of operating a computing system comprising a cache memory having a predetermined number of cache lines, comprising the steps of:
   first, for a plurality of write addresses, writing data to the cache memory at a location corresponding to each of the plurality of write addresses; and
   second, cleaning a selected number of lines in the cache memory in response to a context switch by the computing system;
      wherein for each of the selected number of lines the cleaning step comprises:
         evaluating a dirty indicator corresponding to data in the line; and
         copying data from the line to another memory if the dirty indicator indicates the data in the line is dirty; and
      wherein the selected number of lines cleaned is less than the predetermined number of cache lines; and further comprising the steps of:
   storing a value in an address indicator; and
   in response to each of the plurality of write addresses, setting the value equal to the write address if the write address is less than what is stored in the address indicator, wherein the value in the address indicator represents a final value upon completing the plurality of write addresses; and
   wherein the selected number of lines is responsive to the final value.

6. The method of claim 5 wherein the step of cleaning a selected number of lines in the cache memory comprises cleaning all lines in the cache memory between the final value through and including a first address.

7. The method of claim 6 wherein the first address is a highest address of the cache memory.

8. A method of operating a computing system comprising a cache memory having a predetermined number of cache lines, comprising the steps of:
   first, for a ilurality of write addresses, writing data to the cache memory at a location corresponding to each of the plurality of write addresses; and
   second, cleaning a selected number of lines in the cache memory, wherein the selected number of lines is less than the predetermined number of cache lines;
      wherein for each of the selected number of lines the cleaning step comprises:
         evaluating a dirty indicator corresponding to data in the line; and
         copying data from the line to another memorv if the dirty indicator indicates the data in the line is dirty;
   storing a value in a first address indicator;
   storing a value in a second address indicator; in response to each of the plurality of write addresses, setting the value in the first address indicator equal to the write address if the write address is greater than what is stored in the first address indicator, wherein the value in the first address indicator represents a first final value upon completing the plurality of write addresses;
   in response to each of the plurality of write addresses, setting the value in the second address indicator equal to the write address if the write address is less than what is stored in the second address indicator, wherein the value in the second address indicator represents a second final value upon completing the plurality of write addresses; and wherein the selected number of lines is responsive to the first and second final values.

9. The method of claim 8 wherein the step of cleaning a selected number of lines in the cache memory comprises cleaning all lines in the cache memory between the first final value through and including the second final value.

10. A method of operating a computing system comprising a cache memory having a predetermined number of cache lines, comprising the steps of:

first, for a plurality of write addresses, writing data to the cache memory at a location corresponding to each of the plurality of write addresses; and second, cleaning a selected number of lines in the cache memory in response to a context switch by the computing system;

wherein for each of the selected number of lines the cleaning step comprises:

evaluating a dirty indicator corresponding to data in the line; and copying data from the line to another memory if the dirty indicator indicates the data in the line is dirty; and wherein the selected number of lines cleaned is less than the predetermined number of cache lines; and wherein the computing system comprises an operating system;

wherein the operating system maintains a maximum cache line address corresponding to a maximum address beyond which the cache memory is not written for a context of operation for the computing system; and further comprising the steps of:

storing a value in a first address indicator;

in response to each of the plurality of write addresses, setting the value in the first address indicator equal to the write address if the write address is less than what is stored in the first address indicator, wherein the value in the first address indicator represents a final value upon completing the plurality of write addresses; and wherein the step of cleaning a selected number of lines in the cache memory comprises cleaning all lines in the cache memory between the final value through and including the maximum cache line address.

11. A method of operating a computing system comprising a cache memory having a predetermined number of cache lines, comprising the steps of:

first, for a plurality of write addresses, writing data to the cache memory at a location corresponding to each of the plurality of write addresses; and second, cleaning a selected number of lines in the cache memory in response to a context switch by the computing system;

wherein for each of the selected number of lines the cleaning step comprises:

evaluating a dirty indicator corresponding to data in the line; and copying data from the line to another memory if the dirty indicator indicates the data in the line is dirty; and wherein the selected number of lines cleaned is less than the predetermined number of cache lines; and wherein the computing system comprises an operating system;

wherein the operating system maintains a minimum cache line address corresponding to a minimum address beyond which the cache memory is not written for a context of operation for the computing system; and further comprising the steps of:

storing a value in a first address indicator;

in response to each of the plurality of write addresses, setting the value in the first address indicator equal to the write address if the write address is greater than what is stored in the first address indicator, wherein the value in the first address indicator represents a final value upon completing the plurality of write addresses; and wherein the step of cleaning a selected number of lines in the cache memory comprises cleaning all lines in the cache memory between the minimum cache line address through and including the final value.

12. A method of operating a computing system comprising a cache memory having a predetermined number of cache lines, comprising the steps of:

first, for a plurality of write addresses, writing data to the cache memory at a location corresponding to each of the plurality of write addresses; and second, cleaning a selected number of lines in the cache memory in response to a context switch by the computing system;

wherein for each of the selected number of lines the cleaning step comprises:

evaluating a dirty indicator corresponding to data in the line; and copying data from the line to another memory if the dirty indicator indicates the data in the line is dirty; and wherein the selected number of lines deaned is less than the predetermined number of cache lines and the computing system comprises a single processor.

13. A method of operating a computing system comprising a cache memory having a predetermined number of cache lines, comprising the steps of:

first, for a plurality of write addresses, writing data to the cache memory at a location corresponding to each of the plurality of write addresses; and second, cleaning a selected number of lines in the cache memory in response to a context switch by the computing system;

wherein for each of the selected number of lines the cleaning step comprises:

evaluating a dirty indicator corresponding to data in the line; and copying data from the line to another memory if the dirty indicator indicates the data in the line is dirty; and wherein the selected number of lines cleaned is less than the predetermined number of cache lines and the computing system comprises a plurality of processors.

14. A method of operating a computing system comprising a cache memory having a predetermined number of cache lines, comprising the steps of:

first, for a plurality of write addresses, writing data to the cache memory at a location corresponding to each of the plurality of write addresses; and second, cleaning a selected number of lines in the cache memory in response to a context switch by the computing system;

wherein for each of the selected number of lines the cleaning step comprises:

evaluating a dirty indicator corresponding to data in the line; and copying data from the line to another memory if the dirty indicator indicates the data in the line is dirty; and wherein the selected number of lines cleaned is less than the predetermined number of cache lines and the computing system comprises a wireless data platform system.

15. A method of operating a computing system comprising a cache memory having a predetermined number of cache lines, comprising the steps of:

storing a value in an address indicator;

for a plurality of write addresses, the steps of:
writing data to the cache memory at a location corresponding to each of the plurality of write addresses; and
in response to each of the plurality of write addresses, setting the value equal to the write address if the write address is greater than what is stored in the address indicator, wherein the value in the address indicator represents a final value upon completing the plurality of write addresses; and responsive to a context switch by the computing system, cleaning a selected number of lines in the cache memory;

wherein for each of the selected number of lines the cleaning step comprises:
evaluating a dirty indicator corresponding to data in the line; and
copying data from the line to another memory if the dirty indicator indicates the data in the line is dirty; and wherein the step of cleaning a selected number of lines in the cache memory comprises cleaning all lines in the cache memory between a address zero of the cache memory through and including the final value.

16. A computing system, comprising:

a cache memory having a predetermined number of cache lines;

circuitry, responsive to a plurality of write addresses, for writing data to the cache memory at a location corresponding to each of the plurality of write addresses; and circuitry for cleaning a selected number of lines in the cache memory in response to a context switch by the computing system, wherein for each of the selected number of lines the circuitry for cleaning comprises:
circuitry for evaluating a dirty indicator corresponding to data in the line; and
circuitry for copying data from the line to another memory if the dirty indicator indicates the data in the line is dirty; and
wherein the selected number of lines is less than the predetermined number of cache lines; and further comprising:
an address indicator for storing a value; and
circuitry, responsive to each of the plurality of write addresses, for setting the value equal to the write address if the write address is greater than what is stored in the address indicator, wherein the value in the address indicator represents a final value upon completing the plurality of write addresses; and
wherein the selected number of lines is responsive to the final value.

17. The computing system of claim 16 wherein the circuitry for cleaning a selected number of lines in the cache memory comprises circuitry for cleaning all lines in the cache memory between a first address through and including the final value.

18. The computing system of claim 17 wherein the first address is at address zero of the cache memory.

19. A computing system, comprising:

a cache memory having a predetermined number of cache lines;

circuitry, responsive to a plurality of write addresses, for writing data to the cache memory at a location corresponding to each of the plurality of write addresses; and circuitry for cleaning a selected number of lines in the cache memory in response to a context switch by the computing system, wherein for each of the selected number of lines the circuitry for cleaning comprises:
circuitry for evaluating a dirty indicator corresponding to data in the line; and
circuitry for copying data from the line to another memory if the dirty indicator indicates the data in the line is dirty; and
wherein the selected number of lines is less than the predetermined number of cache lines; and further:
wherein the computing system comprises an operating system;
wherein the operating system maintains a maximum cache line address corresponding to a context of operation for the computing system; and
further comprising circuitry for setting the selected number in response to the maximum cache line address.

20. A computing system, comprising:

a cache memory having a predetermined number of cache lines;

circuitry, responsive to a plurality of write addresses, for writing data to the cache memory at a location corresponding to each of the plurality of write addresses; and circuitry for cleaning a selected number of lines in the cache memory in response to a context switch by the computing system, wherein for each of the selected number of lines the circuitry for cleaning comprises:
circuitry for evaluating a dirty indicator corresponding to data in the line; and
circuitry for copying data from the line to another memory if the dirty indicator indicates the data in the line is dirty; and
wherein the selected number of lines is less than the predetermined number of cache lines; and further comprising:
an address indicator for storing a value; and
circuitry, responsive to each of the plurality of write addresses, for setting the value equal to the write address if the write address is less than what is stored in the address indicator, wherein the value in the address indicator represents a final value upon completing the plurality of write addresses; and
wherein the selected number of lines is responsive to the final value.

21. The computing system of claim 20 wherein the circuitry for cleaning a selected number of lines in the cache memory comprises circuitry for cleaning all lines in the cache memory between the final value through and including a first address.

22. The computing system of claim 21 wherein the first address is a highest address of the cache memory.

23. A computing system, comprising:

a cache memory having a predetermined number of cache lines;

circuitry, responsive to a plurality of write addresses, for writing data to the cache memory at a location corresponding to each of the plurality of write addresses; and circuitry for cleaning a selected number of lines in the cache memory, wherein the selected number of lines is less than the predetermined number of cache lines, and wherein for each of the selected number of lines the circuitry for cleaning comprises:

circuitry for evaluating a dirty indicator corresponding to data in the line; and circuitry for copying data from the line to another memory if the dirty indicator indicates the data in the line is dirty;

a first address indicator for storing a value;

a second address indicator for storing a value;

circuitry, responsive to each of the plurality of write addresses, for setting the value in the first address indicator equal to the write address if the write address is greater than what is stored in the first address indicator, wherein the value in the first address indicator represents a first final value upon completing the plurality of write addresses;

circuitry, responsive to each of the plurality of write addresses, for setting the value in the second address indicator equal to the write address if the write address is less than what is stored in the second address indicator, wherein the value in the second address indicator represents a second final value upon completing the plurality of write addresses; and wherein the selected number of lines is responsive to the first and second final values.

24. The computing system of claim 23 wherein the circuitry for cleaning a selected number of lines in the cache memory comprises circuitry for cleaning all lines in the cache memory between the first final value through and including the second final value.

25. A computing system, comprising:

a cache memory having a predetermined number of cache lines;

circuitry, responsive to a plurality of write addresses, for writing data to the cache memory at a location corresponding to each of the plurality of write addresses; and circuitry for cleaning a selected number of lines in the cache memory in response to a context switch by the computing system, wherein for each of the selected number of lines the circuitry for cleaning comprises:

circuitry for evaluating a dirty indicator corresponding to data in the line; and circuitry for copying data from the line to another memory if the dirty indicator indicates the data in the line is dirty; and wherein the selected number of lines is less than the predetermined number of cache lines; and further:

wherein the computing system comprises an operating system;

wherein the operating system maintains a maximum cache line address corresponding to a maximum address beyond which the cache memory is not written for a context of operation for the computing system; and further comprising:

a first address indicator for storing a value;

circuitry, responsive to each of the plurality of write addresses, for setting the value in the first address indicator equal to the write address if the write address is less than what is stored in the first address indicator, wherein the value in the first address indicator represents a final value upon completing the plurality of write addresses; and wherein the circuitry for cleaning a selected number of lines in the cache memory comprises circuitry for cleaning all lines in the cache memory between the final value through and including the maximum cache line address.

26. A computing system, comprising:

a cache memory having a predetermined number of cache lines;

circuitry, responsive to a plurality of write addresses, for writing data to the cache memory at a location corresponding to each of the plurality of write addresses; and circuitry for cleaning a selected number of lines in the cache memory in response to a context switch by the computing system, wherein for each of the selected number of lines the circuitry for cleaning comprises:

circuitry for evaluating a dirty indicator corresponding to data in the line; and circuitry for copying data from the line to another memory if the dirty indicator indicates the data in the line is dirty; and wherein the selected number of lines is less than the predetermined number of cache lines; and further:

wherein the computing system comprises an operating system;

wherein the operating system maintains a minimum cache line address corresponding to a minimum address beyond which the cache memory is not written for a context of operation for the computing system; and further comprising:

a first address indicator for storing a value;

circuitry, responsive to each of the plurality of write addresses, for setting the value in the first address indicator equal to the write address if the write address is greater than what is stored in the first address indicator, wherein the value in the first address indicator represents a final value upon completing the plurality of write addresses; and wherein the circuitry for cleaning a selected number of lines in the cache memory comprises circuitry for cleaning all lines in the cache memory between the minimum cache line address through and including the final value.

27. A method of operating a computing system comprising a cache memory having a predetermined number of cache lines, comprising the steps of:

first, for a plurality of write addresses, writing data to the cache memory at a location corresponding to each of the plurality of write addresses; and second, cleaning a selected number of lines in the cache memory in response to a context switch by the computing system;

wherein for each of the selected number of lines the cleaning step comprises:

evaluating a dirty indicator corresponding to data in the line; and copying data from the line to another memory if the dirty indicator indicates the data in the line is dirty; and wherein the selected number of lines cleaned is less than the predetermined number of cache lines and wherein the cache memory is accessible by a single processor core.

28. A method of operating a computing system comprising a cache memory having a predetermined number of cache lines, comprising the steps of:
  first, for a plurality of write addresses, writing data to the cache memory at a location corresponding to each of the plurality of write addresses; and
  second, cleaning a selected number of lines in the cache memory in response to a context switch by the computing system;
    wherein for each of the selected number of lines the cleaning step comprises:
      evaluating a dirty indicator corresponding to data in the line; and
      copying data from the line to another memory if the dirty indicator indicates the data in the line is dirty; and
  wherein the selected number of lines cleaned is less than the predetermined number of cache lines and the cache memory is accessible by a plurality of processor cores.

29. A computing system, comprising:
  cache memory having a predetermined number of cache lines;
  an address indicator for storing a value;
  circuitry, responsive to a plurality of write addresses, for writing data to the cache memory at a location corresponding to each of the plurality of write addresses; and
  circuitry, responsive to each of the plurality of write addresses, for setting the value equal to the write address if the write address is greater than what is stored in the address indicator, wherein the value in the address indicator represents a final value upon completing the plurality of write addresses; and
  circuitry, responsive to a context switch by the computing system, for cleaning a selected nunber of lines in the cache memory;
    wherein for each of the selected number of lines the circuitry for cleaning comprises:
      circuitry for evaluating a dirty indicator corresponding to data in the line; and
      circuitry for copying data from the line to another memory if the dirty indicator indicates the data in the line is dirty; and
  wherein the circuitry for cleaning a selected number of lines in the cache memory comprises circuitry for cleaning all lines in the cache memory between a address zero of the cache memory through and including the final value.

* * * * *